US011476892B2

(12) United States Patent
Forest et al.

(10) Patent No.: US 11,476,892 B2
(45) Date of Patent: Oct. 18, 2022

(54) MODULE FOR THE EMISSION/RECEPTION OF SIGNALS, AND CORRESPONDING COMMUNICATION DEVICE

(71) Applicant: STMICROELECTRONICS SA, Montrouge (FR)

(72) Inventors: Jeremie Forest, Villard Bonnot (FR); Vincent Knopik, Crets en Belledonne (FR)

(73) Assignee: STMICROELECTRONICS SA, Montrouge (FR)

( * ) Notice: Subject to any disclaimer, the term of this patent is extended or adjusted under 35 U.S.C. 154(b) by 0 days.

(21) Appl. No.: 17/506,320

(22) Filed: Oct. 20, 2021

(65) Prior Publication Data

US 2022/0123781 A1 Apr. 21, 2022

(30) Foreign Application Priority Data

Oct. 21, 2020 (FR) ...................................... 2010788

(51) Int. Cl.
*H04B 1/58* (2006.01)
*H01Q 1/24* (2006.01)
*H04B 1/401* (2015.01)

(52) U.S. Cl.
CPC ............. *H04B 1/586* (2013.01); *H01Q 1/247* (2013.01); *H04B 1/401* (2013.01)

(58) Field of Classification Search
CPC ........ H01Q 1/247; H04B 1/0458; H04B 1/18; H04B 1/401; H04B 1/52; H04B 1/58; H04B 1/586
See application file for complete search history.

(56) References Cited

U.S. PATENT DOCUMENTS

| 5,375,257 | A | 12/1994 | Lampen | |
|---|---|---|---|---|
| 2008/0132180 | A1* | 6/2008 | Manicone | H04B 1/52 455/83 |
| 2013/0035044 | A1* | 2/2013 | DiNallo | H01Q 1/36 343/895 |
| 2014/0049337 | A1* | 2/2014 | Schmidhammer | H04B 1/52 333/117 |
| 2017/0222687 | A1* | 8/2017 | Wyville | H04B 1/525 |
| 2017/0302429 | A1* | 10/2017 | Brighenti | H04B 1/525 |

* cited by examiner

*Primary Examiner* — Nguyen T Vo
(74) *Attorney, Agent, or Firm* — Slater Matsil, LLP

(57) ABSTRACT

In an embodiment, a circuit includes first, second, and third 90° hybrid couplers coupled between first and second antenna terminals, a pair of low-noise amplifiers (LNAs), and a pair of power amplifiers (PAs). The pair of LNAs is configured to receive first signals from the first and second antenna terminals and has an output configured to be coupled to a receive path. The second coupler is configured in power combiner mode for receiving the first signals. The pair of PAs is configured to transmit second signals via the first and second antenna terminals and has an input configured to be coupled to a transmit path. The third coupler is configured in power divider mode for transmitting the second signals.

22 Claims, 4 Drawing Sheets

MODULE FOR THE EMISSION/RECEPTION OF SIGNALS, AND CORRESPONDING COMMUNICATION DEVICE

CROSS-REFERENCE TO RELATED APPLICATIONS

This application claims the benefit of French Patent Application No. 2010788, filed on Oct. 21, 2020, which application is hereby incorporated herein by reference.

TECHNICAL FIELD

The present disclosure relates generally to an electronic system and method, and, in particular embodiments, to a module for the emission/reception of signals, and corresponding communication device.

BACKGROUND

FIG. 1 shows one example of a structure of a transmit/receive module according to the prior art.

This module MD0 conventionally includes a low-noise amplifier 1, having a conventional structure, known by a person skilled in the art by the acronym LNA, and a power amplifier 2.

When the module MD0 is operating in receive mode, a switch SW1 connects an antenna ANT to the input of the low-noise amplifier 1 and the output of the low-noise amplifier 1 is connected to a signal receive path via another switch SW2.

When the module MD0 is operating in transmit mode, the input of the power amplifier 2 is connected to a transmit path via the switch SW2 and the switch SW1 connects the output of the power amplifier 2 to the antenna ANT.

SUMMARY

However, in general, the input of the low-noise amplifier 1 and the output of the power amplifier 2 do not have the same impedance.

The switch SW1 must thus be configured in such a way that the impedances at the antenna are as identical as possible, whether in receive or transmit mode.

However, this may be difficult to achieve.

Moreover, such a switch SW1 may introduce insertion losses, typically in the order of 1 to 1.5 dB, as well as non-linearities.

There is thus a need to overcome these drawbacks and to propose a simple technical solution for offering similar impedances in transmit and receive modes.

Some embodiments implement such a technical solution while also making instantaneous two-way information transmission ("full duplex" transmission) possible.

Some embodiments relate to the sending (transmission/reception) of signals, in particular of radio frequency signals such as those used in 5G technology, and more particularly the transmit/receive modules situated between an antenna system and frequency conversion stages commonly referred to as front-end modules.

According to an embodiment, a module for transmitting/receiving signals comprises
a first 90° hybrid coupler having a first terminal intended to be coupled to a first antenna terminal of an antenna system, a second terminal intended to be coupled to a second antenna terminal of the antenna system,
a pair of activatable low-noise amplifiers for receiving signals over the two antennas and intended to be coupled, on the output side, to at least one signal receive path,
a second 90° hybrid coupler configured in power combiner mode for receiving the signals and having an input coupled to a third terminal of the first coupler and two outputs respectively coupled to the two inputs of the two low-noise amplifiers,
a pair of activatable power amplifiers for transmitting signals via the two antennas and intended to be coupled, on the input side, to at least one signal transmit path, and
a third 90° hybrid coupler configured in power divider mode for transmitting signals and having two inputs respectively coupled to the two outputs of the two power amplifiers and one output coupled to a fourth terminal of the first hybrid coupler.

Thus, in some embodiments, the switch SW1 of the prior art connected to the antenna is replaced by a trio of 90° hybrid couplers that can be used in transmit or receive mode.

Moreover, in some embodiments, the impedance between the first hybrid coupler and the second and third hybrid couplers is advantageously constant, regardless of whether or not the low-noise amplifiers and power amplifiers are in the active state.

In some embodiments, the insertion losses are in the order of those generated by a conventional switch, but aside from always having the same impedance as mentioned hereinabove, such a trio of hybrid couplers is insensitive to the impedance changes of the antenna system.

The antenna system can have different structures.

Two separate antennas can thus be provided with a so-called circular polarization (i.e. the signals between the two antennas are phase shifted by 90°) or a single antenna with two antenna terminals providing two accesses, again with a so-called circular polarization (the signals between the two antenna terminals (between the two accesses) are phase shifted by 90°).

Although it is possible to couple the output of each low-noise amplifier to a receive path and the input of each power amplifier to a transmit path, in some embodiments, it is particularly advantageous for the module to additionally comprise:
a fourth 90° hybrid coupler configured in power divider mode having two inputs respectively coupled to the two outputs of the low-noise amplifiers and one output intended to be coupled to a receive path, and
a fifth 90° hybrid coupler configured in power combiner mode, having one input intended to be coupled to a signal transmit path and two outputs respectively coupled to the two inputs of the two power amplifiers.

Such an embodiment procures balanced low-noise amplifiers and power amplifiers.

In some embodiments, the signals are advantageously radio frequency signals, for example having a frequency in the order of 60 GHz, which can be used in 5G technology.

In some embodiments, the module can advantageously be produced in an integrated form.

In some embodiments, the mode is used for the instantaneous two-way ("full duplex") transmission of signals.

In an embodiment, a communication device, for example a mobile cell phone or a digital tablet, comprises:
a transmit/receive module as defined hereinabove,
an antenna system including a first antenna terminal coupled to the first terminal of the first coupler of the module and a second antenna terminal coupled to the second terminal of the first coupler of the module, at least one signal receive path coupled to the outputs of the two low-noise amplifiers of the module, and at least one signal transmit path coupled to the inputs of the two power amplifiers of the module.

In an embodiment, a transmit/receive module MD includes a trio of 90° hybrid couplers (CHY1, CHY2, CHY3) coupled between a pair of low-noise amplifiers (LNA1, LNA2), a pair of power amplifiers (PA1, PA2) and an antenna system (ANT1, ANT2).

BRIEF DESCRIPTION OF THE DRAWINGS

Other advantages and features of the invention will become apparent upon examining the detailed description of non-limiting embodiments and methods of implementing the invention, and from the accompanying drawings in which.

DETAILED DESCRIPTION OF ILLUSTRATIVE EMBODIMENTS

Figure 1:
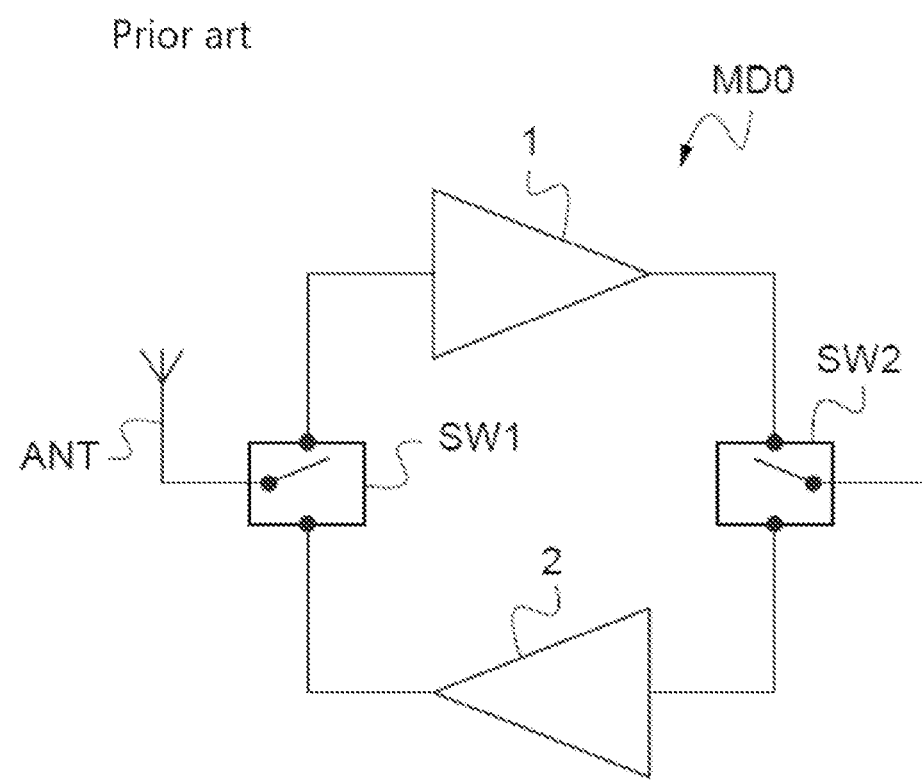
FIG. 1 shows a device of the prior art.
Figure 2:
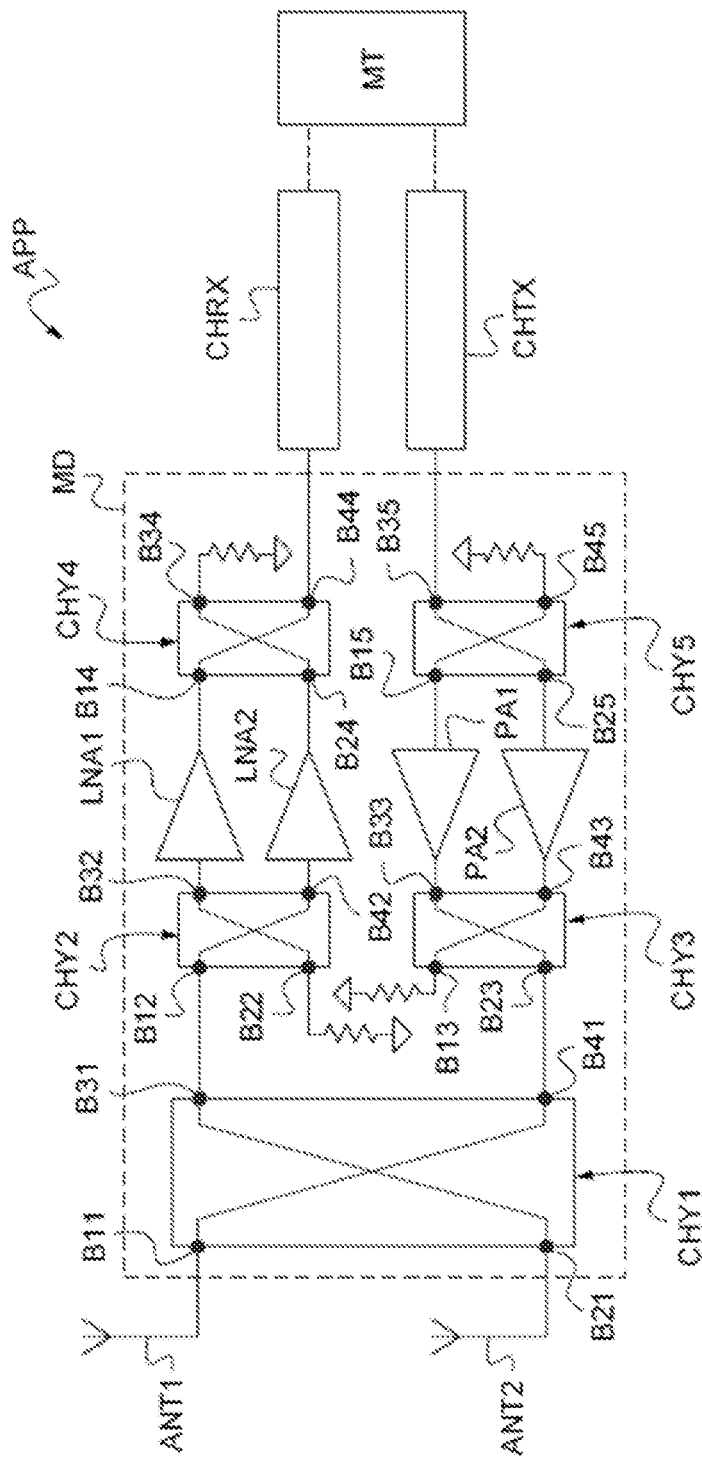
FIGS. 2-5 diagrammatically show embodiments and methods of implementing the invention.

In FIG. 2, the reference APP denotes a communication device, for example a mobile cell phone or a digital tablet, however these examples are not limiting.

The device APP comprises, at the front end, a signal transmit/receive circuit MD, for example for transmitting/receiving radio frequency signals.

This circuit MD, commonly referred to by a person skilled in the art as a "front end module," is connected between an antenna system and a signal receive path CHRX and a signal transmit path CHTX.

The antenna system has two antenna terminals and can have different structures.

Two separate antennas can thus be provided with a so-called circular polarization (i.e. the signals between the two antennas are phase shifted by 90°) or a single antenna with two antenna terminals providing two accesses, again with a so-called circular polarization (the signals between the two antenna terminals (between the two accesses) are phase shifted by 90°).

In the description herein-below, the antenna system is considered to include two separate antennas ANT1 and ANT2 respectively having two antenna terminals. For simplification purposes, the two antenna terminals of this system are also denoted by the references ANT1 and ANT2.

The module MD comprises a first 90° hybrid coupler CHY1.

This first hybrid coupler CHY1 has a first terminal B11 coupled to the first antenna terminal ANT1 and a second terminal B21 coupled to the second antenna terminal ANT2.

The module MD further includes a second 90° hybrid coupler CHY2 having an input terminal B12 coupled to a third terminal B31 of the first hybrid coupler CHY1.

The second hybrid coupler CHY2 further includes a second terminal B22 coupled to the ground via a resistor.

This second hybrid coupler CHY2 further includes a third terminal B32 coupled to the input of a first low-noise amplifier LNA1 and a fourth output terminal B42 coupled to the input of a second low-noise amplifier LNA2.

The module MD further includes a third 90° hybrid coupler CHY3 having two inputs B33 and B43 respectively coupled to the two outputs of two power amplifiers PA1 and PA2.

This third hybrid coupler CHY3 further includes an output B13 connected to the ground via a resistor and an output B23 coupled to a fourth terminal B41 of the first hybrid coupler CHY1.

Furthermore, in order to obtain low-noise amplifiers and power amplifiers that are completely balanced, the module MD further includes, in this embodiment, a fourth 90° hybrid coupler CHY4 and a fifth 90° hybrid coupler CHY5.

The hybrid coupler CHY4 is configured in power divider mode and has two inputs B14 and B24 respectively coupled to the two outputs of the two low-noise amplifiers LNA1 and LNA2 and an output B44 coupled to a signal receive path CHRX with a conventional structure.

The terminal B34 of this fourth hybrid coupler CHY4 is connected to the ground via a resistor.

The fifth 90° hybrid coupler CHY5, configured in power combiner mode, has an input B35 coupled to a signal transmit path CHTX with a conventional structure and another input B45 connected to the ground via a resistor.

This fifth hybrid coupler CHY5 further includes two outputs B15 and B25 respectively coupled to the two inputs of the two power amplifiers PA1 and PA2.

As mentioned herein-above, the structure of the transmit and receive paths (CHRX and CHTX) is conventional and known per se. Thus, the transmit path CHRX in particular includes a frequency conversion stage for conversion to baseband and the transmit path CHTX can include a frequency conversion stage for conversion from baseband to the radio frequency domain.

The two paths CHRX and CHTX are connected to a processing circuit MT, for example a baseband processor for processing the data received or to be transmitted.

The structure of each hybrid coupler is also well known. By way of illustration, each hybrid coupler can include quarter-wavelength transmission lines, the dimensions whereof depend on the frequency of the signals received or to be transmitted.

Figure 3:
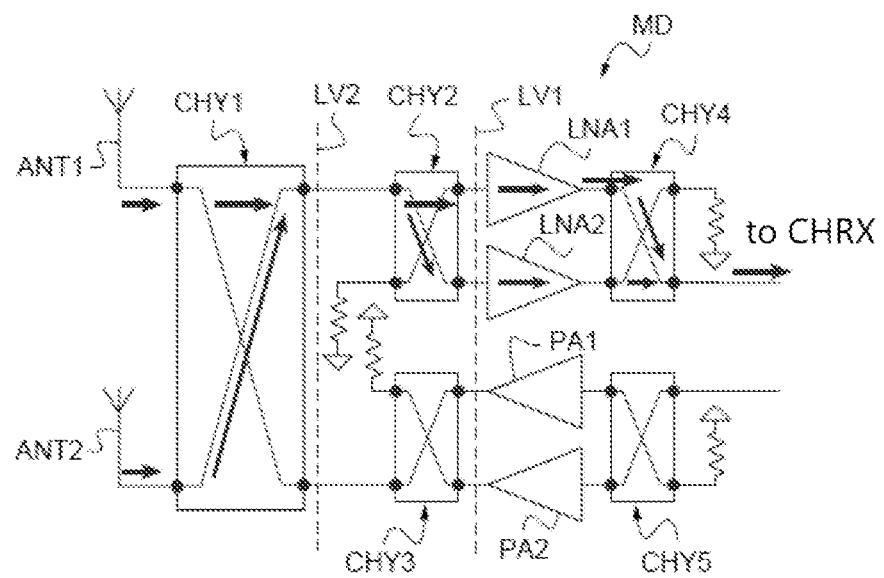

FIG. 3 shows the operation of the module MD during the reception of signals over the antennas ANT1 and ANT2.

The signals propagate according to the arrows shown in FIG. 3 as far as the receive path CHRX.

Moreover, the second hybrid coupler CHY2 is shown to be configured in power combiner mode.

Figure 4:
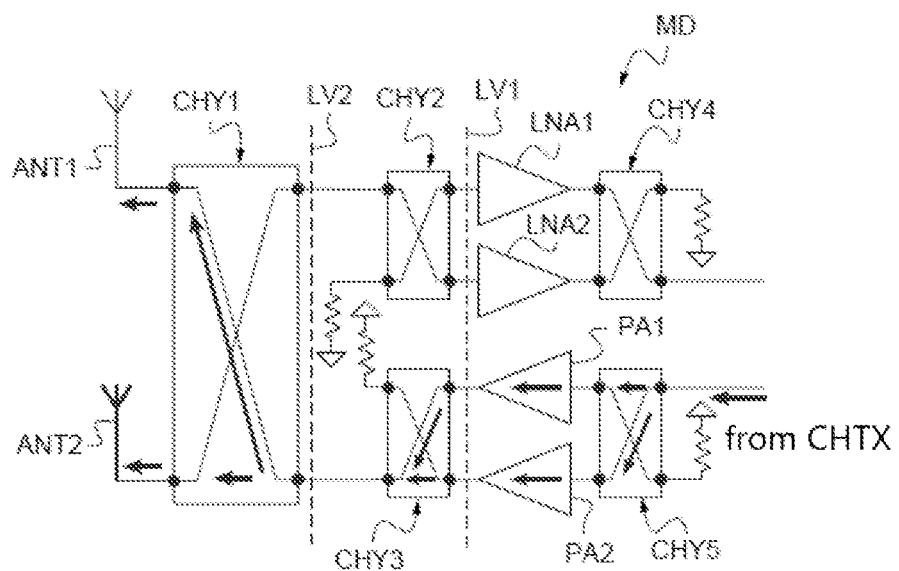

FIG. 4 shows the operation of the module MD during transmission of signals from the transmit path CHTX.

Again, these signals propagate according to the arrows shown in FIG. 4 to be transmitted via the two antennas ANT1 and ANT2.

In this case, the third hybrid coupler CHY3 is shown to be configured in power divider mode.

The triple hybrid coupler structure of the module MD isolates each of the units LNA1, LNA2 and PA1, PA2, and obtains isolation between these two units while allowing for circular polarization thanks to the first hybrid coupler CHY1 which is fed to the two antennas with a phase shift of 90° C.

This further increases the isolation.

Moreover, such a structure can be used in the scope of instantaneous two-way ("full duplex") transmission.

Furthermore, in some embodiments, when in receive mode, the low-noise amplifiers LNA1 and LNA2 are activated and the power amplifiers PA1 and PA2 are deactivated.

In this case, the impedance at the dotted line LV1 (FIG. 3) is different at the input of the low-noise amplifiers than at the output of the power amplifiers.

By way of illustration, the impedance at the input of the activated low-noise amplifiers can be equal to 40 ohms, whereas the impedance at the output of the deactivated power amplifiers can be in the order of 3 ohms.

When in transmit mode (FIG. 4), in some embodiments, the low-noise amplifiers LNA1 and LNA2 are deactivated, whereas the power amplifiers PA1 and PA2 are activated.

In this case, at level LV1, the impedance at the input of the low-noise amplifiers LNA1 is different from the impedance at the output of the power amplifiers PA1 and PA2.

By way of illustration, the impedance at the input of the deactivated low-noise amplifiers can be equal to 3 ohms, whereas the impedance at the output of the activated power amplifiers can be equal to 40 ohms.

However, regardless of the transmit or receive mode, the impedance between the first hybrid coupler CHY1 and the second and third hybrid couplers CHY2 and CHY3 (dotted line LV2) remains constant, for example equal to 40 ohms.

The invention is not limited to the embodiments and methods of implementing the invention described hereinabove, but encompasses all alternative embodiments.

Figure 5:
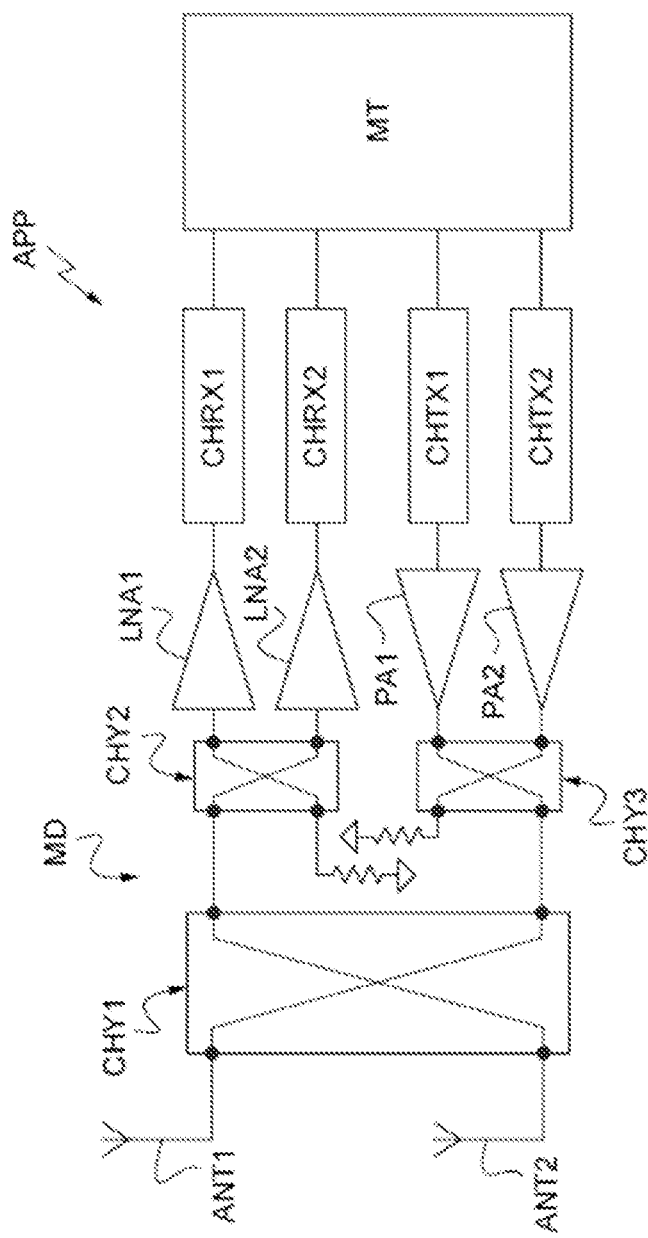

Thus, as shown in FIG. 5, it is possible, albeit less advantageous in terms of balancing the low-noise amplifiers LNA1, LNA2 and the power amplifiers PA1 and PA2, to dispense with the use of the fourth and fifth hybrid couplers CHY4 and CHY5 to directly connect the outputs of the two power amplifiers LNA1 and LNA to two receive paths CHRX1 and CHX2 and to connect two transmit paths CHTX1 and CHTX2 directly to the inputs of the power amplifiers PA1 and PA2.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A circuit comprising:
   a first 90° hybrid coupler having a first terminal configured to be coupled to a first antenna terminal of an antenna system, and a second terminal configured to be coupled to a second antenna terminal of the antenna system;
   a pair of activatable low-noise amplifiers configured to receive first signals from the first and second antenna terminals and having an output configured to be coupled to a signal receive path;
   a second 90° hybrid coupler configured in power combiner mode for receiving the first signals, the second 90° hybrid coupler having an input terminal coupled to a third terminal of the first 90° hybrid coupler and first and second output terminals respectively coupled to first and second inputs of the pair of activatable low-noise amplifiers;
   a pair of activatable power amplifiers configured to transmit second signals via the first and second antenna terminals and having a first input configured to be coupled to a signal transmit path; and
   a third 90° hybrid coupler configured in power divider mode for transmitting the second signals, the third 90° hybrid coupler having first and second input terminals respectively coupled to first and second outputs of the pair of activatable power amplifiers and an output terminal coupled to a fourth terminal of the first 90° hybrid coupler.

2. The circuit of claim 1, wherein the second 90° hybrid coupler has a further terminal coupled to a ground terminal via a first resistor, and wherein the third 90° hybrid coupler has a further terminal coupled to the ground terminal via a second resistor.

3. The circuit of claim 1, wherein, when in receive mode, the circuit is configured to:
   cause the propagation of the first signals from the first and second antenna terminals to the signal receive path via the first and second 90° hybrid couplers and the pair of activatable low-noise amplifiers; and
   deactivate the pair of activatable power amplifiers when the circuit operates in the receive mode.

4. The circuit of claim 1, wherein, when in receive mode, the circuit is configured to:
   cause the propagation of the first signals from the first and second antenna terminals to the signal receive path via the first and second 90° hybrid couplers and the pair of activatable low-noise amplifiers; and
   cause an impedance at the first and second outputs of the pair of activatable power amplifiers to be lower than an impedance at the first and second inputs of the pair of activatable low-noise amplifiers.

5. The circuit of claim 4, wherein, when in receive mode, the circuit is configured to cause the impedance at the first and second outputs of the pair of activatable power amplifiers to be about 3 ohms and the impedance at the first and second inputs of the pair of activatable low-noise amplifiers to be about 40 ohms.

6. The circuit of claim 1, wherein, when in transmit mode, the circuit is configured to:
   cause the propagation of the second signals from the signal transmit path to the first and second antenna terminals via the pair of activatable power amplifiers and the third and first 90° hybrid couplers; and
   deactivate the pair of activatable low-noise amplifiers when the circuit operates in the transmit mode.

7. The circuit of claim 1, wherein, when in transmit mode, the circuit is configured to:
   cause the propagation of the second signals from the signal transmit path to the first and second antenna terminals via the pair of activatable power amplifiers and the third and first 90° hybrid couplers; and
   cause an impedance at the first and second inputs of the pair of activatable low-noise amplifiers to be lower than an impedance at the first and second outputs of the pair of activatable power amplifiers.

8. The circuit of claim 1, wherein, when in receive mode, the circuit is configured to cause the propagation of the first signals from the first and second antenna terminals to the signal receive path via the first and second 90° hybrid couplers and the pair of activatable low-noise amplifiers, wherein, when in transmit mode, the circuit is configured to cause the propagation of the second signals from the signal transmit path to the first and second antenna terminals via the pair of activatable power amplifiers and the third and first 90° hybrid couplers, wherein an impedance between the first 90° hybrid coupler and the second 90° hybrid coupler remains constant irrespective of whether the circuit operates in receive mode or transmit mode, and wherein an impedance between the first 90° hybrid coupler and the third 90° hybrid coupler remains constant irrespective of whether the circuit operates in receive mode or transmit mode.

9. The circuit of claim 8, wherein the circuit is configured to simultaneously operate in the receive mode and the transmit mode.

10. The circuit of claim 1, further comprising the signal transmit path, the signal receive path, and a processor having an input coupled to an output of the signal receive path and to an output coupled to an input of the signal transmit path.

11. The circuit of claim 1, further comprising a first antenna coupled to the first antenna terminal, and a second antenna coupled to the second antenna terminal.

12. The circuit of claim 1, further comprising:
- a fourth 90° hybrid coupler configured in power divider mode, the fourth 90° hybrid coupler having first and second input terminals respectively coupled to first and second outputs of the pair of activatable low-noise amplifiers and an output configured to be coupled to the signal receive path; and
- a fifth 90° hybrid coupler configured in power combiner mode, the fifth 90° hybrid coupler having an input terminal configured to be coupled to the signal transmit path and first and second output terminals respectively coupled to the first input of the pair of activatable power amplifiers and a second input of the pair of activatable power amplifiers.

13. The circuit of claim 12, wherein the fourth 90° hybrid coupler has a further terminal coupled to a ground terminal via a first resistor, and wherein the fifth 90° hybrid coupler has a further terminal coupled to the ground terminal via a second resistor.

14. The circuit of claim 1, wherein a first low-noise amplifier of the pair of activatable low-noise amplifiers has an output configured to be coupled to the signal receive path, and wherein a second low-noise amplifier of the pair of activatable low-noise amplifiers has an output configured to be coupled to a further signal receive path.

15. The circuit of claim 1, wherein a first power amplifier of the pair of activatable power amplifiers has an input configured to be coupled to the signal transmit path, and wherein a second power amplifier of the pair of activatable power amplifiers has an input configured to be coupled to a further signal transmit path.

16. The circuit of claim 1, wherein the first and second signals are radio frequency signals.

17. The circuit of claim 1, wherein the circuit is produced in an integrated form.

18. A method comprising:
- receiving first signals from first and second antennas;
- propagating the first signals through a first 90° hybrid coupler having a first terminal coupled to the first antenna of an antenna system, and a second terminal coupled to a second antenna of the antenna system;
- receiving the first signals from the first 90° hybrid coupler with a second 90° hybrid coupler configured in power combiner mode, the second 90° hybrid coupler having an input terminal coupled to a third terminal of the first 90° hybrid coupler and first and second output terminals respectively coupled to first and second inputs of a pair of activatable low-noise amplifiers;
- delivering the first signals to a processor with the pair of activatable low-noise amplifiers via a signal receive path;
- receiving from the processor second signals via a signal transmit path using a pair of activatable power amplifiers;
- transmitting the second signals to the first 90° hybrid coupler with a third 90° hybrid coupler configured in power divider mode, the third 90° hybrid coupler having first and second input terminals respectively coupled to first and second outputs of the pair of activatable power amplifiers and an output terminal coupled to a fourth terminal of the first 90° hybrid coupler; and
- delivering the second signals to the first and second antennas with the first 90° hybrid coupler.

19. The method of claim 18, further comprising simultaneously receiving the first signals with the antenna system and transmitting the second signals with the antenna system for instantaneous two-way signal transmission.

20. The method of claim 18, wherein the first and second signals have a frequency of about 60 GHz.

21. A communication device comprising:
- first and second antennas;
- a first 90° hybrid coupler having a first terminal coupled to the first antenna, and a second terminal coupled to the second antenna;
- a pair of activatable low-noise amplifiers configured to receive first signals from the first and second antenna;
- a signal receive path coupled to an output of the pair of activatable low-noise amplifiers;
- a second 90° hybrid coupler configured in power combiner mode for receiving the first signals, the second 90° hybrid coupler having an input terminal coupled to a third terminal of the first 90° hybrid coupler and first and second output terminals respectively coupled to first and second inputs of the pair of activatable low-noise amplifiers;
- a signal transmit path;
- a pair of activatable power amplifiers configured to transmit second signals via the first and second antennas and having a first input coupled to the signal transmit path; and
- a third 90° hybrid coupler configured in power divider mode for transmitting the second signals, the third 90° hybrid coupler having first and second input terminals respectively coupled to first and second outputs of the pair of activatable power amplifiers and an output terminal coupled to a fourth terminal of the first 90° hybrid coupler.

22. The communication device of claim 21, further comprising a processor coupled to the signal transmit path and to the signal receive path.

* * * * *